(12) United States Patent
Manteiga et al.

(10) Patent No.: US 6,371,725 B1
(45) Date of Patent: Apr. 16, 2002

(54) CONFORMING PLATFORM GUIDE VANE

(75) Inventors: John Alan Manteiga, North Andover; Jeffrey Howard Nussbaum, Wilmington; Joseph Capozzi, North Reading; John Lawrence Noon, Swampscott, all of MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/607,753

(22) Filed: Jun. 30, 2000

(51) Int. Cl.[7] .................................................. F01D 1/02
(52) U.S. Cl. .................................. 415/209.4; 415/210.1
(58) Field of Search ................................ 415/191, 189, 415/209.2, 209.3, 209.4, 210.1

(56) References Cited

U.S. PATENT DOCUMENTS

| | | | |
|---|---|---|---|
| 4,639,189 A | * | 1/1987 | Rosman ........................ 415/115 |
| 4,832,568 A | * | 5/1989 | Roth et al. ................... 415/189 |
| 5,765,993 A | * | 6/1998 | Weiss ........................ 415/209.2 |
| 5,853,286 A | | 12/1998 | Bussonnet et al. ...... 416/193 A |

OTHER PUBLICATIONS

GE Aircraft Engines, "CF34–3; CF6–6; GE90; and CF6–80C Fan Outlet Guide Vanes," used in the United States for more than one year, two drawing sheet excerpts.
U.S. application No. 09/607,491, filed concurrently herewith, B.J. Anderson et al, "Conforming Platform Fan Blade".

* cited by examiner

*Primary Examiner*—Edward K. Look
*Assistant Examiner*—Richard Edgar
(74) *Attorney, Agent, or Firm*—Andrew C. Hess; Nathan D. Herkamp

(57) ABSTRACT

A fan outlet guide vane includes integral outer and inner platforms conforming to arcuate sides thereof, and multiple mounting bosses on the platforms. The platform sides are arcuate to conform with the vane sides for improving aerodynamic efficiency. The multiple mounting bosses improve mounting of the vanes to corresponding supporting rings.

20 Claims, 3 Drawing Sheets

CONFORMING PLATFORM GUIDE VANE

BACKGROUND OF THE INVENTION

The present invention relates generally to gas turbine engines, and, more specifically, to fan outlet guide vanes therein.

A turbofan gas turbine engine is typically used for powering an aircraft in flight. A fan is disposed inside a surrounding nacelle and is driven by a core engine for producing thrust to power the aircraft in flight.

Disposed axially downstream from the row of fan blades is a fan outlet guide vane frame or flowpath including a row of outlet guide vanes (OGVs) which deswirl the fan air prior to discharge from the engine. The OGVs extend radially between and are mounted to an outer supporting ring, and an inner supporting ring mounted to the front frame of the core engine forming an OGV frame.

The OGVs are primarily aerodynamic members precisely configured in profile for maximizing aerodynamic efficiency as the fan air is discharged from the engine. The OGVs are typically bolted to the outer and inner rings, and include associated platforms at the opposite span ends thereof for defining the boundaries for the fan air. The platforms may be integral with the OGVs, or may be discrete members mounted therebetween. In both configurations, the platforms create corresponding gaps. Any radial step at the platform gaps due to manufacturing tolerances reduces aerodynamic efficiency.

The number of OGVs is selected for various reasons including aerodynamic performance and attenuation of fan noise during operation. The corresponding airfoils of the OGVs may therefore have relatively high curvature or camber, and may be assembled in a row with high vane count. However, the inner platforms are necessarily disposed at a smaller radius from the engine centerline axis than the outer platforms. For a given number of vanes, the available circumference at the inner platforms is substantially less than that for the outer platforms.

Since the vanes are typically individually assembled between the outer and inner supporting rings, relatively high vane count and relatively high camber makes difficult, if not impossible, assembly of the vanes on low radius ratio fans.

The components of the OGV frame are typically designed for minimizing the overall weight thereof for increasing the efficiency of the engine. The individual OGVs are typically bolted to the supporting rings which affects the vibratory natural frequencies thereof. In order to prevent undesirable aeroelastic flutter and other forms of vibratory stress, the OGVs should have a relatively high natural frequency.

However, the desire to minimize weight requires a relatively thin outer supporting ring, yet a thin ring has less resistance to bending from loads carried thereto by the mounted vanes, and tends to lower the bending natural frequencies of the assembly.

Accordingly, it is desired to provide an improved fan OGV frame for improving aerodynamic efficiency with improved mounting of the vanes in the rings.

BRIEF SUMMARY OF THE INVENTION

A fan outlet guide vane includes integral outer and inner platforms conforming to arcuate sides thereof, and multiple mounting bosses on the platforms. The platform sides are arcuate to conform with the vane sides for improving aerodynamic efficiency. The multiple mounting bosses improve mounting of the vanes to corresponding supporting rings.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
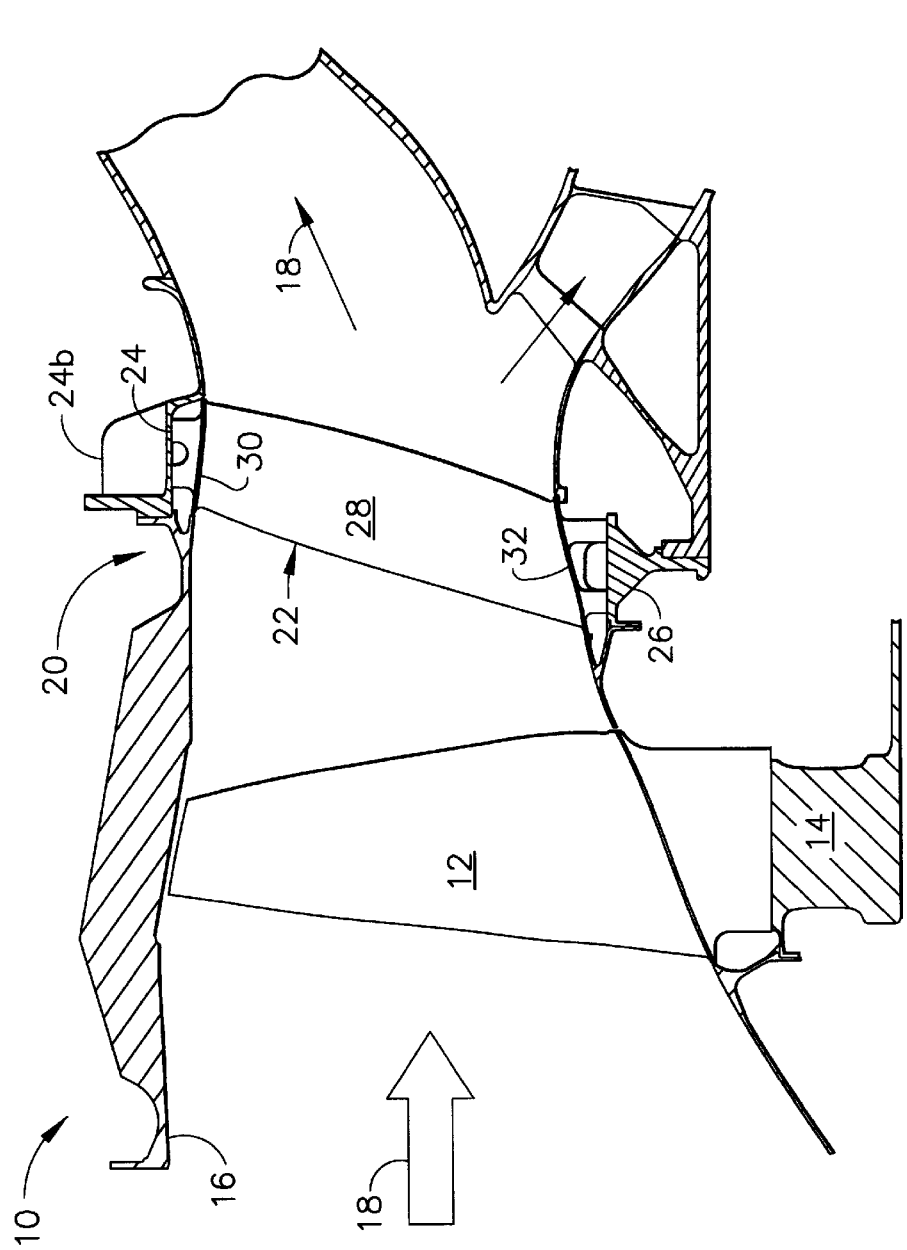
FIG. 1 is an axial sectional view through a portion of a fan in an exemplary turbofan gas turbine engine in accordance with an exemplary embodiment of the present invention.

Illustrated in FIG. 1 is a fan 10 of a turbofan gas turbine engine configured for powering an aircraft in flight. The fan includes a row of fan rotor blades 12 extending radially outwardly from a supporting fan rotor disk 14 which is powered during operation by a low pressure turbine of the engine (not shown).

The fan blades are mounted inside a surrounding fan case 16 (shown in part) which defines an outer boundary for ambient air 18 which is pressurized by the fan blades during operation.

Disposed downstream from the fan blades 12 is a fan outlet guide frame 20 which is an assembly of components defining a flowpath for deswirling the fan air prior to discharge from the engine for producing propulsion thrust. The OGV frame includes a row of circumferentially adjoining outlet guide vanes 22 extending radially between outer and inner supporting rings 24,26. The outer ring 24 forms part of the flowpath, and the inner ring 26 is suitably supported to the structural front frame of the engine in a conventional manner.

Figure 2:
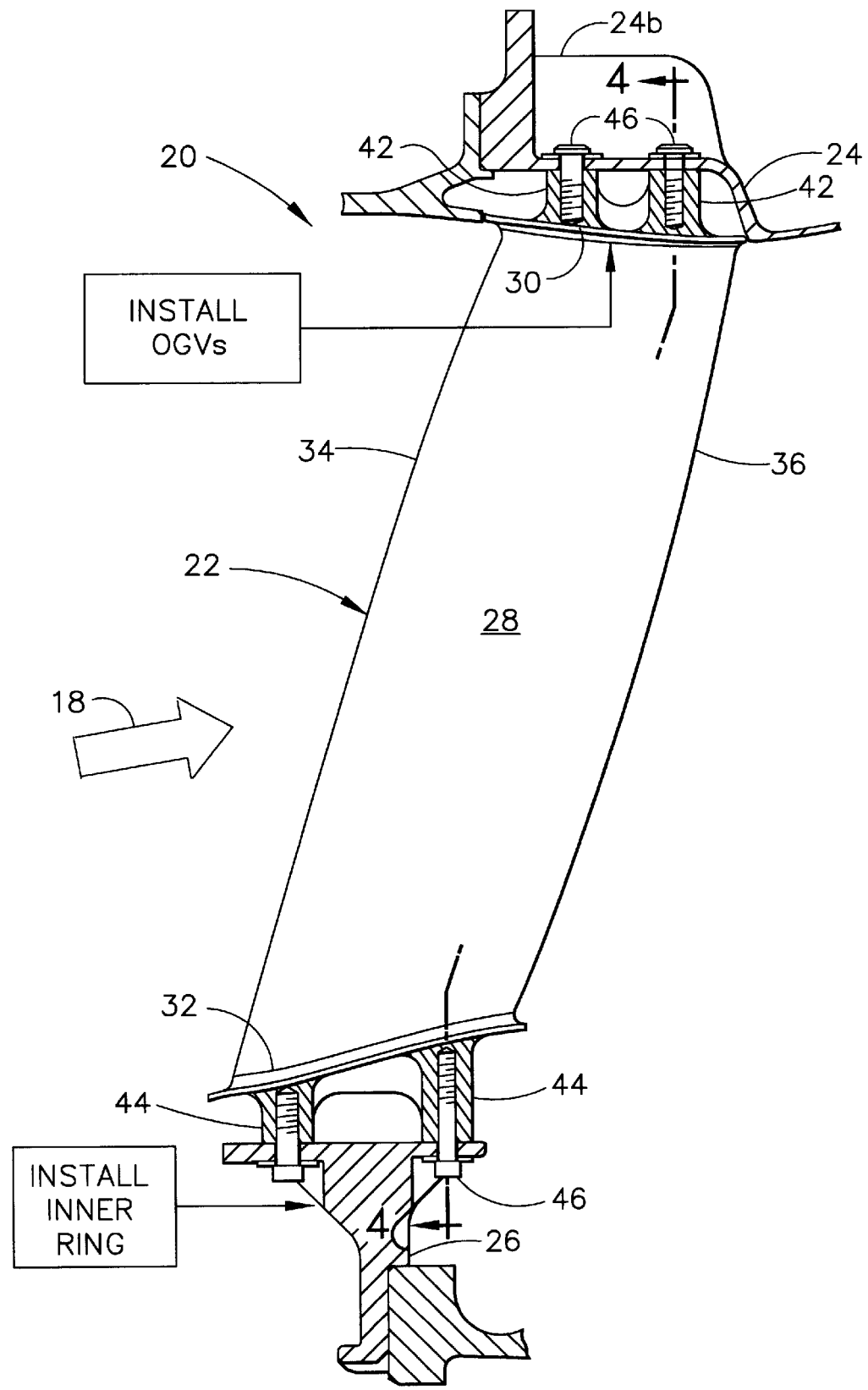
FIG. 2 is an enlarged axial sectional view through the fan outlet guide vane frame illustrated in FIG. 1 including a row of outlet guides vanes, and an associated method of assembly thereof.

FIG. 2 illustrates a preferred mounting assembly of the OGVs 22 in their supporting rings 24,26. And, FIG. 3 illustrates an exemplary embodiment of the OGVs 22 themselves.

Each of the OGVs 22 includes an airfoil 28 suitably configured for deswirling the air discharged from the fan blades. In accordance with the present invention, each airfoil includes radially outer and inner platforms 30,32 fixedly attached at opposite span ends thereof in an integral, or preferably unitary one-piece assembly. The OGV assembly may be formed by conventional forging and machining of suitable metal, such as aluminum or titanium.

Figure 3:
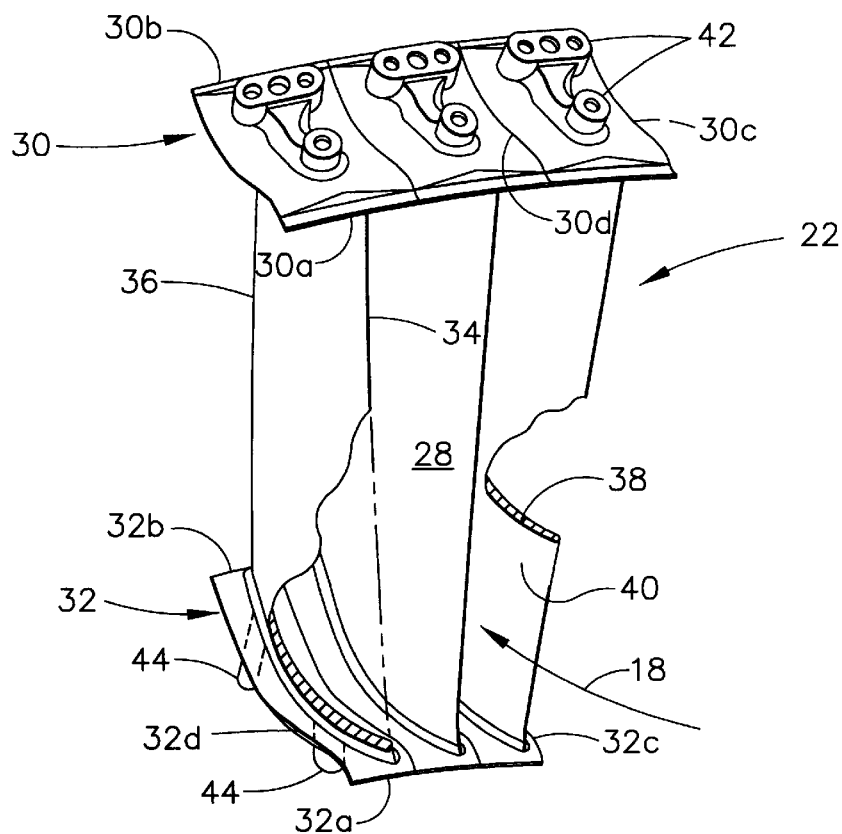
FIG. 3 is an isometric view of three exemplary adjoining vanes of FIG. 1, with the supporting rings being removed for clarity.

As shown in FIG. 3, each airfoil 28 includes axially opposite leading and trailing edges 34,36 between which axially extends circumferentially opposite first and second sides 38,40 of the airfoil. The aerodynamic profile of the airfoil 28 is conventionally determined for deswirling the fan air. The airfoil first side 38 is generally concave and defines a pressure side, whereas the airfoil second side 40 is generally convex and defines a suction side. The individual airfoils are thusly arcuate in radial section with a suitable amount of camber or curvature thereof, and typically include a limited amount of angular twist between their opposite span ends.

Correspondingly, each of the outer and inner platforms includes a leading or forward end 30a,32a, and a trailing or aft end 30b,32b which define edges extending in the circumferential direction.

Each of the outer and inner platforms also includes an arcuate first side 30c,32c conforming in profile with the airfoil first side 38. And, an arcuate second side 30d,32d of the outer and inner platforms conforms in profile with the airfoil second sides 40.

Since the airfoil first side 38 is generally concave, the corresponding first sides 30c,32c of the outer and inner platforms are similarly concave. And, since the airfoil second side 40 is generally convex, the second sides 30d,32d of the outer and inner platforms are similarly convex.

Since the vanes and their platforms as illustrated in FIG. 3 circumferentially adjoin each other, the platform first sides 30c,32c are complementary in axial profile with the corresponding second sides 30d,32d of the platforms between the leading and trailing edges of the airfoils. In this way, the opposing sides of the circumferentially adjoining outer and inner platforms define a relatively small gap therebetween which follows the curvature or camber of the airfoils at the inboard flow surfaces of the outer and inner platforms.

In this way, as the fan air 18 is channeled between the adjoining airfoils 28 as illustrated in FIG. 3, the air flows along the singular gaps between adjoining platforms with minimal pressure loss. The integral platforms eliminate some of the gaps otherwise found in discrete platform configurations and therefore improves aerodynamic efficiency.

The arcuate sides of the platforms ensure that the fan air flows generally therealong and additionally minimizes aerodynamic losses which would otherwise occur with the air flowing obliquely across the straight gaps found in conventional designs. In the event of any radial step at the arcuate junctions of the platforms due to manufacturing tolerances, aerodynamic losses therefrom are minimized since the curvature of the platform edges is selected to parallel the local streamlines of the airflow therealong.

Since the arcuate sides of the outer and inner platforms conform or match the corresponding opposite sides of the arcuate airfoils, a substantial amount of camber and twist may be introduced in the airfoils without a correspondingly large increase in platform surface area which would otherwise be required for straight-sided platforms of conventional design. This is particularly important for the inner platforms 32 which are disposed at a lower radius from the engine centerline axis than the outer platforms 30

More specifically, the inner platforms 32 illustrated in FIG. 3 are correspondingly narrower in circumferential width than the outer platforms 30. The limited available collective circumference of the inner platforms is more efficiently used by using the conforming arcuate sides of the platforms instead of straight sides. In this way, the lateral width or extension of the inner platforms on opposite sides of the airfoils may be generally equal and suitably small to permit the assembly of a relatively large number of vanes in the OGV row.

Although more circumference is available for the outer platforms 30, the circumferential width or extent of the individual platforms on opposite sides of the airfoils is also generally equal for maximizing the effective use of those platforms, as opposed to straight sided conventional platforms.

As shown in FIGS. 2 and 3, the outer and inner platforms include respective outer and inner mounting bosses 42,44 which are local enlargements of the platforms extending from the respective outboard surfaces thereof, oppositely from the corresponding inboard surfaces which define the flowpath boundary for the fan air. The individual bosses include internal screw threads therein which receive corresponding mounting bolts 46 extending through the respective outer and inner rings.

Figure 4:
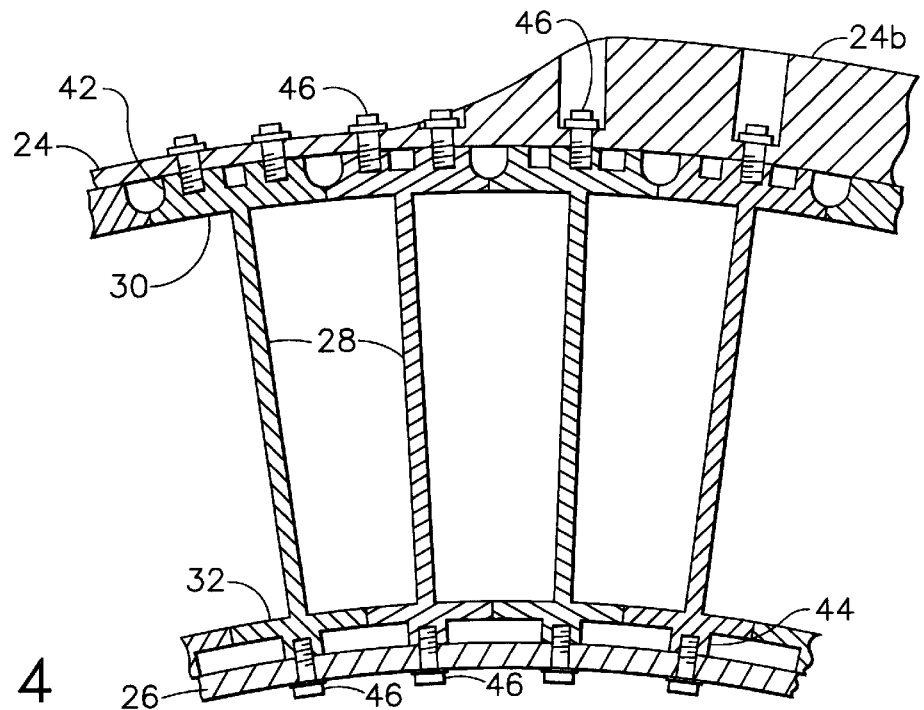
FIG. 4 is a radial sectional view through a portion of the OGV frame illustrated in FIG. 2 and taken along line 4—4.

As shown in FIGS. 3 and 4, multiple outer bosses 42 are used in the outer platforms, and multiple inner bosses 44 are used in the inner platforms, and the inner bosses are collectively narrower in circumferential extent than the outer bosses in view of the limited circumferential width of the inner platforms.

More specifically, each of the inner platforms 32 illustrated in FIG. 2 includes a pair of forward and aft inner bosses 44 which are coaxially aligned with the airfoil 28, as shown in FIGS. 3 and 4, both along the radial span axis thereof as well as axially along the camber line thereof between the leading and trailing edges 34,36. In this way, the inner bosses 44 are disposed directly below corresponding portions of the airfoils 28 and permit the inner platforms 32 to remain relatively narrow and thin on both sides thereof except as required for the local thickening for the individual bosses. Load transfer is therefore directly through the center of the inner platforms between the coaxially aligned bosses and airfoil.

The outer platforms 30 initially shown in FIG. 3 include a different multiple of the outer mounting bosses 42 than the inner bosses for several advantages. Each outer platform preferably includes a single forward outer boss and a plurality of laterally or circumferentially aligned aft outer bosses, which are coaxially aligned in part with the airfoil 28 between the leading and trailing edges thereof.

In the preferred embodiment illustrated in FIG. 3, the outer bosses 42 include three laterally aligned aft bosses including a center boss disposed between a pair of outboard bosses. The aft center outer boss is coaxially aligned along the radial span of the airfoil 28, as well as being aligned along the camber line with the forward outer boss. The aft outboard bosses are disposed on opposite sides of the center boss, and are spaced laterally away from the underlying airfoil 28. The outer platforms are relatively thin except for the local thickening required for introducing the several outer bosses. The three aft outer bosses are ganged together in a monolithic group for enhancing the structural rigidity thereof.

As shown in FIGS. 2 and 4, the outer supporting ring 24 is relatively thin in radial section over most of its circumferential extent for minimizing overall weight. However, the outer ring includes several locally thick sections 24b for providing additional strength for accommodating mounting loads from engine mounts located at these discrete regions. For example, the engine may be mounted to an aircraft fuselage by engine mounts requiring two supports around the outer ring 24 on opposite vertical sides thereof. In this way, the outer ring may include four locally thick regions 24b separated circumferentially from the remaining thin sections of the outer ring for permitting the engine to be mounted to the left or right side of the aircraft fuselage as desired.

Since the thin sections of the outer ring 24 are more flexible than the thick sections thereof, it is desirable to mount the outer platforms to the outer ring using corresponding bolts at the forward outer boss and the two outboard outer bosses as shown in FIGS. 2 and 4 for a total of three mounting bolts per outer platform. The inner platforms 32 are mounted to the inner ring using a only pair of the mounting bolts 46 in the two forward and aft inner bosses 44.

Since the two outboard outer bosses 42 are bolted to the outer ring as illustrated in FIG. 4, they increase the structural rigidity of the assembly, and correspondingly increase the natural frequency thereof. The aft center outer bosses illustrated in FIG. 4 are not bolted to the thin section of the outer ring, for eliminating a bolt thereat and reducing the number of parts required to reduce weight.

However, in the locally thick sections 24b of the outer ring as illustrated in FIG. 4, a corresponding mounting bolt 46 is used for the aft center outer boss in addition to bolting of the forward outer boss. Since the thick section of the outer ring 24 is relatively rigid, the two outboard bosses are not bolted to the outer ring, with the center bolting of the outer platforms providing a direct radial loadpath through the vanes at this location which enhances buckling resistance of the vanes for better accommodating reaction loads through the engine mounts.

Accordingly, all of the vanes 22 located in the relatively thin sections of the outer ring 24 include corresponding mounting bolts in the two aft outward bosses 42 for enhancing bending resistance when joined to the outer ring, with the center bosses thereat remaining empty without a corresponding mounting bolt being used therein.

Correspondingly, all of the vanes 22 located at the locally thick sections 24b of the outer ring include a corresponding mounting bolt 46 in the aft center bosses 42 and not in the corresponding outboard bosses. In this way, the four multiple outer boss configuration illustrated in FIG. 3 maintains identity of design of the individual OGVs 22, and permits different mounting to the outer ring as desired. Only two mounting bolts are required in the outer platforms for those vanes attached to the thicker section of the outer ring. And, only three outer mounting bolts are required for those vanes mounted to the thin sections of the outer ring.

The OGVs 22 are thusly identical in configuration but may be differently used in the same outlet guide vane row depending upon the particular location therein relative to the engine mounts. Furthermore, the individual OGVs 22 may be formed of a suitable metal such as aluminum for sufficient strength for their intended use. And, the airfoils of those OGVs 22 located at the thicker sections of the outer ring may be formed of titanium for the enhanced strength thereof as desired.

In view of the arcuate conformance of the vane platforms to the desired amount of camber of the airfoils, an improved method of assembly of the OGVs 22 is required for a high vane count and high camber configuration which would otherwise prevent the axial assembly of the individual vanes in a complete row.

More specifically, FIG. 2 illustrates schematically that each of the OGVs 22 may be individually installed in the corresponding outer ring 24 by axially and radially inserting the corresponding outer platforms 30 into position. The corresponding outer mounting bolts 46 are then inserted though the outer ring to engage the corresponding outer bosses 42.

In this way, the full row of OGVs 22 may be initially installed in the outer ring circumferentially adjoining each other, with adjacent ones of the outer and inner platforms 30,32 being nested together along their arcuate opposite sides. Irrespective of the amount of camber of the airfoils and corresponding arcuate curvature of the platform sides as illustrated in FIG. 3, the individual vanes, including the lastly installed vane, may be installed radially into position without obstruction from circumferentially adjoining vanes.

As shown in FIG. 2, the inner ring 26 may then be axially installed inside the full collective complement of inner platforms 32, followed in turn by installing the respective mounting bolts 46 through the inner ring in engagement with the respective inner bosses 44.

The OGVs 22 described above with conforming arcuate platforms enjoy substantial benefits in aerodynamic efficiency, manufacture, assembly, and operation, including vibratory response and load carrying capability. The conforming inner platforms have minimum surface area and permit a large number of OGVs to be assembled in a single row, with substantial camber if desired. The multiple outer boss configuration of the outer platforms permits the use of a relatively thin supporting outer ring having enhanced stiffness due to the outboard fastening of the outer platforms. However, the same configuration outer platforms may also be used at the locally thick sections of the outer ring for carrying substantial buckling loads through the OGVs thereat.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A fan outlet guide vane comprising:
   an airfoil having outer and inner platforms fixedly attached at opposite span ends thereof in a unitary assembly; and
   each of said platforms having arcuate sides conforming with corresponding opposite sides of said airfoil, and respective outer and inner bosses extending from outboard surfaces thereof for receiving corresponding mounting bolts, with opposite inboard flow surfaces thereof defining flowpath boundaries.

2. A vane according to claim 1 wherein said airfoil includes:
   a concave first side, and said outer and inner platforms have corresponding concave first sides; and
   a convex second side, and said outer and inner platforms have corresponding convex second sides.

3. A vane according to claim 2 wherein said airfoil further includes opposite leading and trailing edges extending between corresponding leading and trailing ends of said outer and inner platforms, and said first sides of said outer and inner platforms are complementary with corresponding second sides of said outer and inner platforms between said leading and trailing edges.

4. A vane according to claim 3 wherein said inner platform is narrower than said outer platform, and said inner bosses are collectively narrower than said outer bosses.

5. A vane according to claim 4 wherein:
   said inner platform includes a pair of forward and aft inner bosses coaxially aligned with said airfoil between said leading and trailing edges; and
   said outer platform includes a forward outer boss and a plurality of laterally aligned aft outer bosses, coaxially aligned in part with said airfoil between said leading and trailing edges.

6. A vane according to claim 5 wherein said aft outer bosses include a center boss coaxially aligned with said airfoil, and a pair of outboard bosses disposed on opposite sides of said center boss.

7. A vane according to claim 6 in combination with a plurality of said vanes circumferentially adjoining each other, with adjacent ones of said outer and inner platforms being nested together along said arcuate sides thereof.

8. A fan outlet guide vane frame comprising:

a row of circumferentially adjoining outlet guide vanes extending radially between outer and inner rings;

each of said vanes including an airfoil with outer and inner platforms fixedly attached at opposite span ends thereof in a unitary assembly; and each of said platforms having arcuate sides conforming with corresponding opposite sides of said airfoil, and respective outer and inner bosses extending from outboard surfaces thereof receiving corresponding mounting bolts, with opposite inboard flow surfaces thereof defining flowpath boundaries.

9. A frame according to claim 8 wherein each of said airfoils further includes opposite leading and trailing edges extending between corresponding leading and trailing ends of said outer and inner platforms, and said arcuate sides of said outer and inner platforms on one of said vanes are complementary with corresponding arcuate sides of said outer and inner platforms on a circumferentially adjoining vane between said leading and trailing edges.

10. A frame according to claim 9 wherein each of said airfoils includes:

a concave first side, and said outer and inner platforms have corresponding concave first sides; and a convex second side, and said outer and inner platforms have corresponding convex second sides.

11. A method of assembling said fan outlet guide vane frame according to claim 10, comprising:

individually installing each of said vanes to said outer ring, and engaging said mounting bolts with said outer bosses through said outer ring; and installing said inner ring inside said inner platforms, and engaging said mounting bolts with said inner bosses through said inner ring.

12. A method according to claim 11 further comprising circumferentially adjoining said vanes together, with adjacent ones of said platforms being nested together along said arcuate sides thereof.

13. A frame according to claim 10 wherein said inner platforms are circumferentially narrower than said outer platforms in each of said vanes, and said inner bosses are collectively circumferentially narrower than said outer bosses.

14. A frame according to claim 10 wherein:

said inner platforms each includes a pair of forward and aft inner bosses coaxially aligned with said airfoil between said leading and trailing edges; and said outer platforms each includes include a forward outer boss and a plurality of laterally aligned aft outer bosses, coaxially aligned in part with said airfoil between said leading and trailing edges.

15. A frame according to claim 14 wherein said aft outer bosses include a center boss coaxially aligned with said airfoil, and a pair of outboard bosses disposed on opposite sides of said center boss.

16. A frame according to claim 15 wherein one of said vanes includes a mounting bolt in said center boss and not in said outboard bosses, and another one of said vanes includes mounting bolts in both said outboard bosses and not in said center boss.

17. A frame according to claim 15 wherein said outer ring includes locally thin and thick sections, and said outer bosses are bolted to said thin section, and said center boss is bolted to said thick section.

18. A frame according to claim 17 wherein said center bosses are not bolted to said thin section, and said outer bosses are not bolted to said thick section.

19. A fan outlet guide vane having integral outer and inner platforms being unitary therewith and conforming to arcuate sides thereof, and said platforms having different multiples of mounting bosses thereon.

20. A vane according to claim 19 wherein:

said platforms have concave first sides and convex opposite second sides;

said inner platform includes a pair of mounting bosses coaxially aligned with said vane between said leading and trailing edges thereof; and said outer platform includes a forward mounting boss coaxially aligned with said vane at said leading edge, and three laterally aligned aft bosses.

* * * * *